United States Patent
Laslo et al.

(10) Patent No.: US 8,480,983 B1
(45) Date of Patent: Jul. 9, 2013

(54) MERCURY CAPTURE SYSTEM AND METHOD FOR A WET FLUE GAS DESULFURIZATION SYSTEM

(75) Inventors: Dennis James Laslo, Ten Mile, TN (US); Raymond Raulfs Gansley, Knoxville, TN (US)

(73) Assignee: Alstom Technology Ltd, Baden (CH)

(*) Notice: Subject to any disclaimer, the term of this patent is extended or adjusted under 35 U.S.C. 154(b) by 0 days.

(21) Appl. No.: 13/421,413

(22) Filed: Mar. 15, 2012

(51) Int. Cl.
*B01D 53/50* (2006.01)
*B01D 53/64* (2006.01)
*B01D 53/74* (2006.01)
*B01D 53/78* (2006.01)

(52) U.S. Cl.
USPC ...... 423/210; 423/243.01; 422/168; 422/169; 422/170; 422/171; 422/172

(58) Field of Classification Search
USPC ............... 423/210, 243.01; 422/168–171
See application file for complete search history.

(56) References Cited

U.S. PATENT DOCUMENTS

| | | | | |
|---|---|---|---|---|
| 5,695,726 | A * | 12/1997 | Lerner | 423/210 |
| 7,507,287 | B1 * | 3/2009 | Luan | 106/772 |
| 7,625,537 | B2 * | 12/2009 | Rader et al. | 423/210 |
| 7,799,297 | B2 * | 9/2010 | Saito | 423/210 |
| 2009/0155149 | A1 * | 6/2009 | Chang et al. | 423/210 |
| 2012/0183458 | A1 * | 7/2012 | Olson et al. | 423/210 |

* cited by examiner

*Primary Examiner* — Timothy Vanoy
(74) *Attorney, Agent, or Firm* — Rita D. Vacca

(57) ABSTRACT

A wet flue gas desulfurization (WFGD) system includes an absorber vessel operable to remove pollutants from flue gas supplied thereto. The absorber vessel defines a slurry section for containing a reagent slurry therein and an outlet in fluid communication with the slurry section. The WFGD system includes a mercury removal vessel in fluid communication with outlet. The mercury removal vessel has activated carbon disposed therein.

19 Claims, 2 Drawing Sheets

MERCURY CAPTURE SYSTEM AND METHOD FOR A WET FLUE GAS DESULFURIZATION SYSTEM

FIELD

The present invention is generally directed to mercury capture for a wet flue gas desulfurization (WFGD) system and in particular to a WFGD absorber vessel having an outlet in fluid communication with another vessel having activated carbon disposed therein for adsorbing mercury from a reagent slurry supplied from the WFGD absorber vessel.

BACKGROUND

Some fossil fuel power plants combust coal for the production of steam that is in turn employed in the production of electricity. Coal contains sulfur. As a result of the combustion of the coal, a portion of the sulfur reacts with oxygen and forms sulfur dioxide ($SO_2$), which is present in flue gas generated by the combustion of the coal. Sulfur dioxide is a known pollutant. The flue gas may also contain contaminants, including, but not limited to particulates, nitrogen oxides ($NO_x$), mercury, carbon dioxide ($CO_2$), and the like. Mercury, in particular organically bound mercury, poses significant health hazards to humans.

Accordingly, several countries have established environmental regulations to limit the amount of sulfur dioxide and mercury in flue gas released to the atmosphere. One method of reducing or eliminating sulfur dioxide in flue gas prior to release is to treat the flue gas in a desulfurization absorber tower. The flue gas can react with a slurry of wet limestone ($CaCO_3$) in the absorber tower to form calcium sulfite ($CaSO_3$) and calcium sulfate ($CaSO_4$). A portion of the mercury, such as ionized mercury (i.e., $Hg^{2+}$), can be initially removed in the desulfurization absorber towers. However, as a result of chemical reactions in the desulfurization absorber towers, a portion of the captured $Hg^{2+}$ can be converted back to elemental mercury (i.e., $Hg^0$) and pass back into the flue gas, referred to as "reemitted" mercury. Such reemission can increase mercury levels in the flue gas beyond regulated limits.

SUMMARY

According to aspects disclosed herein, there is provided a wet flue gas desulfurization (WFGD) system that includes an absorber vessel operable to remove pollutants from flue gas supplied thereto. The absorber vessel includes a slurry section for containing a reagent slurry therein. The absorber vessel includes an outlet in fluid communication with the slurry section. In addition, the WFGD system includes a mercury removal vessel in fluid communication with the outlet. The mercury removal vessel has activated carbon disposed therein. In one embodiment, the activated carbon is disposed in the mercury removal vessel in a pile, a moving bed, a fluidized bed and/or mixed in with the mercury-rich effluent.

In another aspect defined herein, the activated carbon is operable to remove substantially all mercury from the reagent slurry received in the mercury removal vessel. In one embodiment, the activated carbon is of pebble and/or granular form.

In yet another aspect disclosed herein, there is provided a WFGD system including an absorber vessel operable to remove pollutants from flue gas supplied thereto. The absorber vessel defines a slurry section for containing a reagent slurry therein. The absorber vessel includes an outlet in fluid communication with the slurry section. The WFGD system includes a dewatering system in fluid communication with the outlet. The WFGD system includes a mercury removal vessel in fluid communication with and positioned downstream of the dewatering system. The mercury removal vessel has activated carbon disposed therein. In one embodiment, the activated carbon is disposed in the mercury removal vessel in a pile, a moving bed, a fluidized bed and/or mixed in with the mercury-rich effluent.

There is also disclosed herein a method of operating the WFGD system. The method includes providing an absorber vessel defining a slurry section for containing a reagent slurry therein. The absorber vessel includes an outlet in fluid communication with the slurry section. The outlet is in fluid communication with a mercury removal vessel. The mercury removal vessel has activated carbon disposed therein. A reagent and water are supplied to the absorber vessel. Flue gas containing mercury is introduced into the absorber vessel and is contacted by the reagent slurry. The reagent slurry absorbs the mercury and becomes rich in mercury (i.e., a mercury-rich reagent slurry). A portion of the mercury-rich reagent slurry is supplied to the mercury removal vessel. The activated carbon adsorbs the mercury from the mercury-rich reagent slurry thereby producing treated reagent slurry. The treated reagent slurry is returned to the absorber vessel.

There is also disclosed herein another method of operating the WFGD system including providing an absorber vessel defining a slurry section for containing a reagent slurry therein. The absorber vessel includes an outlet in fluid communication with the slurry section. A dewatering system is in fluid communication with the outlet. A mercury removal vessel is positioned downstream of and is in fluid communication with the dewatering system. The mercury removal vessel has activated carbon disposed therein. The method includes supplying a reagent and water to the absorber vessel. Flue gas containing mercury is introduced into the absorber vessel and contacted by the reagent slurry. The reagent slurry absorbs the mercury and becomes rich in mercury (i.e., a mercury-rich reagent slurry). A portion of the mercury-rich reagent slurry is introduced into the dewatering system. Solids are separated from the mercury-rich reagent slurry to create a mercury-rich effluent stream that has substantially lower suspended solids than the mercury-rich reagent slurry introduced to the dewatering system. The mercury-rich effluent is supplied to the mercury removal vessel where the activated carbon adsorbs the mercury from the mercury-rich effluent, thereby producing treated effluent. The treated effluent is returned to the absorber vessel or other portion of the WFGD system. A portion of the treated effluent may be sent away from the WFGD system for disposal or further treatment for other purposes.

BRIEF DESCRIPTION OF FIGURES

With reference now to the figures where all like parts are numbered alike.

DETAILED DESCRIPTION

Figure 1:
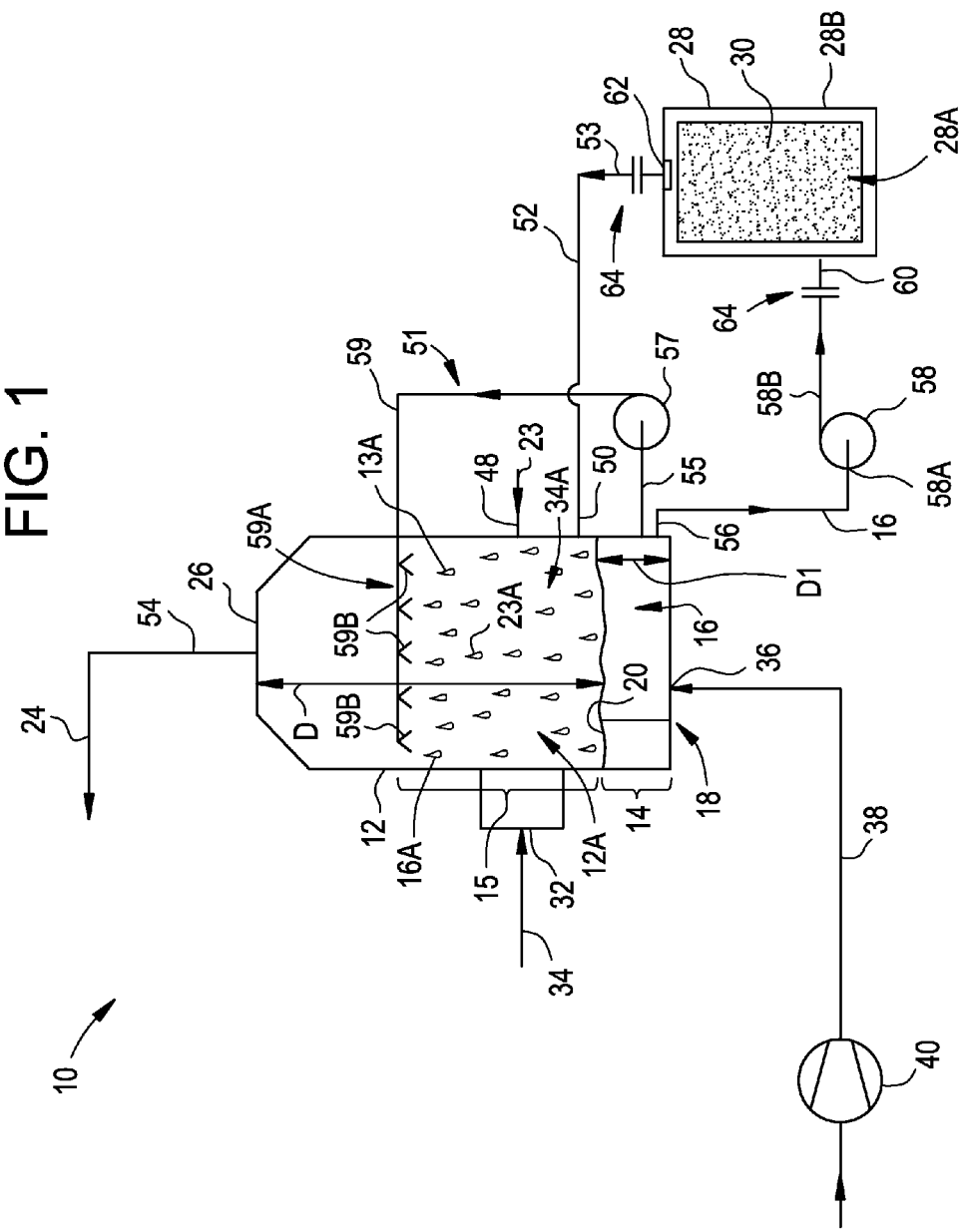
FIG. 1 is a schematic diagram in cross section of a wet flue gas desulfurization system disclosed herein.

As illustrated in FIG. 1, a wet flue gas desulfurization (WFGD) system for use in removing pollutants such as sulfur dioxide ($SO_2$) and mercury from a flue gas stream is generally designated by the numeral 10 and includes an absorber vessel 12 in an interior area 12A with a portion of the interior area defining a slurry section 14 for containing a reagent slurry 16. The slurry section 14 extends upwardly from a bottom portion 18 of the absorber vessel 12 to an interface 20 that separates the reagent slurry 16 (i.e., a reagent 23 such as limestone $CaCO_3$ in a foam, aerated slurry and/or slurry) and flue gas 34A flowing in a treatment area 15 of the interior area 12A. The interface 20 is located in the interior area 12A a distance D from a top portion 26 of the absorber vessel 12. The magnitude of the distance D depends on and can vary with operating conditions of the WFGD system 10. The WFGD system 10 includes a mercury removal vessel 28 in fluid communication with the slurry section 14 of the absorber vessel 12. The mercury removal vessel 28 has an interior area 28A with activated carbon 30 disposed therein. In one embodiment, the activated carbon 30 is disposed in the mercury removal vessel 28 in a pile, as described herein. The activated carbon 30 is operable to remove substantially all mercury from the reagent slurry 16 received in the mercury removal vessel 28, as described below.

While the absorber vessel 12 is shown and described as having a slurry section 14 for containing a reagent slurry 16 that extends upwardly from a bottom portion 18 of the absorber vessel 12 to an interface 20 that separates the reagent slurry 16 and the flue gas 34A, the present disclosure is not limited in this regard as other absorber configurations may be employed including but not limited to those which include a section therein for effecting contact between the flue gas 34A and the reagent slurry 16.

The absorber vessel 12 defines a first inlet 32 for receiving flue gas 34 for treatment in the interior area 12A of the absorber vessel. The absorber vessel 12 also defines a second inlet 36 for receiving in the interior area 12A air 38 supplied by a compressor 40 for aerating the reagent slurry 16. The absorber vessel 12 defines a third inlet 48 for receiving in the interior area 28A the reagent 23 and a fourth inlet 50 for receiving in the interior area 12A treated slurry 52 discharged from an outlet 53 of the mercury removal vessel 28. In one embodiment, the mercury removal vessel 28 is separate from the absorber vessel 12.

While the absorber vessel 12 is shown and described as having a first inlet 32, second inlet 36, third inlet 48 and a fourth inlet 50 the absorber vessel may have any number of inlets at any location. In one embodiment, the treated slurry is directed to another vessel prior to being returned to the absorber 12.

The absorber vessel 12 also defines a first outlet 54 for discharging from the interior area 12A the treated flue gas 24. The absorber vessel 12 further defines a second outlet 56 in fluid communication with the slurry section 14 for discharging from the interior area 12A the reagent slurry 16 to an inlet 58A of a pump 58. An outlet 58B of the pump 58 is in fluid communication with an inlet 60 of the mercury removal vessel 28. The pump 58 is configured to pump the reagent slurry through the pump 58 and into the interior area 28A of the mercury removal vessel 28. In one embodiment, the pump 58 is a centrifugal pump. The second outlet 56 of the absorber vessel 12 is located in the slurry section 14 (i.e., below the interface 20) of the absorber vessel 12 so that the reagent slurry 16 can be discharged from the absorber vessel 12 for treatment (i.e., mercury removal) in the mercury removal vessel 28. Locating the second outlet 56 in the slurry section 14 precludes the treated flue gas 24 from exiting the absorber vessel 12 through the second outlet. In addition, the second outlet 56 is spaced away from the interface 20 by a sufficient distance D1 to allow the flue gas 34 to be treated in the absorber vessel 12 rather than flowing as a gas to the mercury removal vessel 28. In one embodiment, the second outlet 56 is in fluid communication with the inlet 60 of the mercury removal vessel 28. In one embodiment, the inlet 60 of the mercury removal vessel 28 is positioned downstream of the second outlet 56. While the pump 58 is shown and described as being installed between the absorber vessel 12 and the mercury removal vessel 28, the present disclosure is not limited in this regard as the absorber vessel and the mercury removal vessel may be in direct communication with one another between the second outlet 56 and the inlet 60, without a pump.

A recirculation loop 51 is in fluid communication with the absorber vessel 12 via a line 55 which fluidly couples the absorber vessel to a pump 57. Another line 59 fluidly couples the pump 57 to the absorber vessel 12. The reagent slurry 16 is pumped through the line 59 into the distribution header 59A and is dispersed as reagent droplets 16A into the treatment area 15 of the absorber 12 via a plurality of nozzles 59B. The reagent droplets 16A contact the flue gas 34 and absorb the pollutants from the flue gas 34. While the reagent slurry 16 is shown and described as being pumped into the distribution header 59A and being discharged as the reagent droplets via the nozzles 59B, the present disclosure is not limited in this regard as other configurations for causing contact between the flue gas and the reagent slurry 16 may be employed including but not limited to cross flowing the flue gas and the reagent through baffle plates, mixing blades and/or screens disposed in the absorber vessel.

In one embodiment, the activated carbon 30 is disposed in a pile in the interior area 28A of the mercury removal vessel 28 with pieces of the activated carbon lying one upon another. The activated carbon 30 in pebble, sand and/or granular form may be employed. The individual pebbles and/or granules of the activated carbon 30 are supported by each other, defining a self supporting configuration. In one embodiment, the activated carbon 30 pebbles and/or granules are not embedded in, attached to or supported by a matrix of fibers, a mesh, a fabric, one or more screens or the like. In one embodiment, the activated carbon 30 is disposed in a permeable container 28B (e.g., a net, a porous basket or a cage) having passages sized to retain the activated carbon in the container while allowing the reagent slurry to flow therethrough. In one embodiment, the activated carbon 30 is stationary when the reagent slurry 16 flows therethrough. In yet another embodiment, the activated carbon 30 moves within the container 28B or the mercury removal vessel 28 as a fluidized bed while the reagent slurry flows therethrough and/or mixed in with the mercury-rich effluent.

In one embodiment, a screen 62 is positioned in the outlet 53 and/or in the mercury removal vessel 28 adjacent to the outlet 53. The screen 62 is configured to prevent the activated carbon 30 from exiting the mercury removal vessel 28 or becoming entrained with the reagent slurry 16 being treated. Thus the activated carbon 30 is retained in the interior area 28A of the mercury removal vessel 28. A sufficient amount of activated carbon 30 is disposed in the mercury removal vessel 28 to capture substantially all of the mercury (i.e., at least 90%) contained in the reagent slurry 16 transported into the mercury removal vessel. In one embodiment, the mercury removal vessel 28 is configured in a canister form having coupling devices 64 positioned adjacent to the inlet 60 and the outlet 53 to facilitate replacement of the mercury removal vessel 28 when the activated carbon 30 becomes saturated with mercury. In one embodiment, the mercury removal vessel 28 is configured to be disposable. In one embodiment, the activated carbon 30 is transported into and out of the mercury vessel 28, for example via a moving bed. The moving bed of activated carbon provides an adequate supply of activated carbon for mercury removal and an adequate rate of removal of mercury-rich activated carbon, without having to shut down or interrupt the mercury removal process.

While a pile of the pebbles and/or granules of the activated carbon 30 is described as being disposed in the mercury removal vessel 28, the present disclosure is not limited in this regard as a matrix of fibers, a mesh, a fabric, one or more screens, or a combination thereof may be employed to support, position and or space apart the pebbles and/or granules from one another, or to facilitate placement and/or removal of the activated carbon 30 into and out of the mercury removal vessel 28.

The present disclosure includes a method of operating the WFGD system 10, wherein the absorber vessel 12 is provided with the reagent slurry 16 contained in the slurry section 14. The mercury removal vessel 28 is in fluid communication with the second outlet 56. The mercury removal vessel 28 has activated carbon 30 disposed therein. In one embodiment, a pile of the activated carbon 30 is disposed in the mercury removal vessel 28. The method includes supplying the reagent 23 to the absorber vessel 12 via the fourth inlet 48. Flue gas 34 is conveyed into the absorber vessel 12 via the first inlet 32. The flue gas 34 mixes with and chemically reacts with the reagent slurry 16 to remove pollutants, including mercury and sulfur dioxide, from the flue gas 34. As a result, the reagent slurry 16 becomes mercury-rich. A portion of the mercury-rich reagent slurry 16 is directed from the absorber vessel 12 to the mercury removal vessel 28 via the pump 58. The activated carbon 30 disposed in the mercury removal vessel 28 adsorbs the mercury from the mercury-rich reagent slurry 16 to produce treated reagent slurry 52. In one embodiment, the activated carbon absorbs the mercury from the mercury-rich reagent slurry 16. Treated reagent slurry 52 that has substantially low levels of mercury therein (relative to the bulk reagent slurry 16) is discharged from the mercury removal vessel 28 to the absorber vessel 12. In one embodiment, the reagent slurry 16 is aerated by flowing compressed air 38 through the second inlet 36 into the absorber vessel 12.

Figure 2:
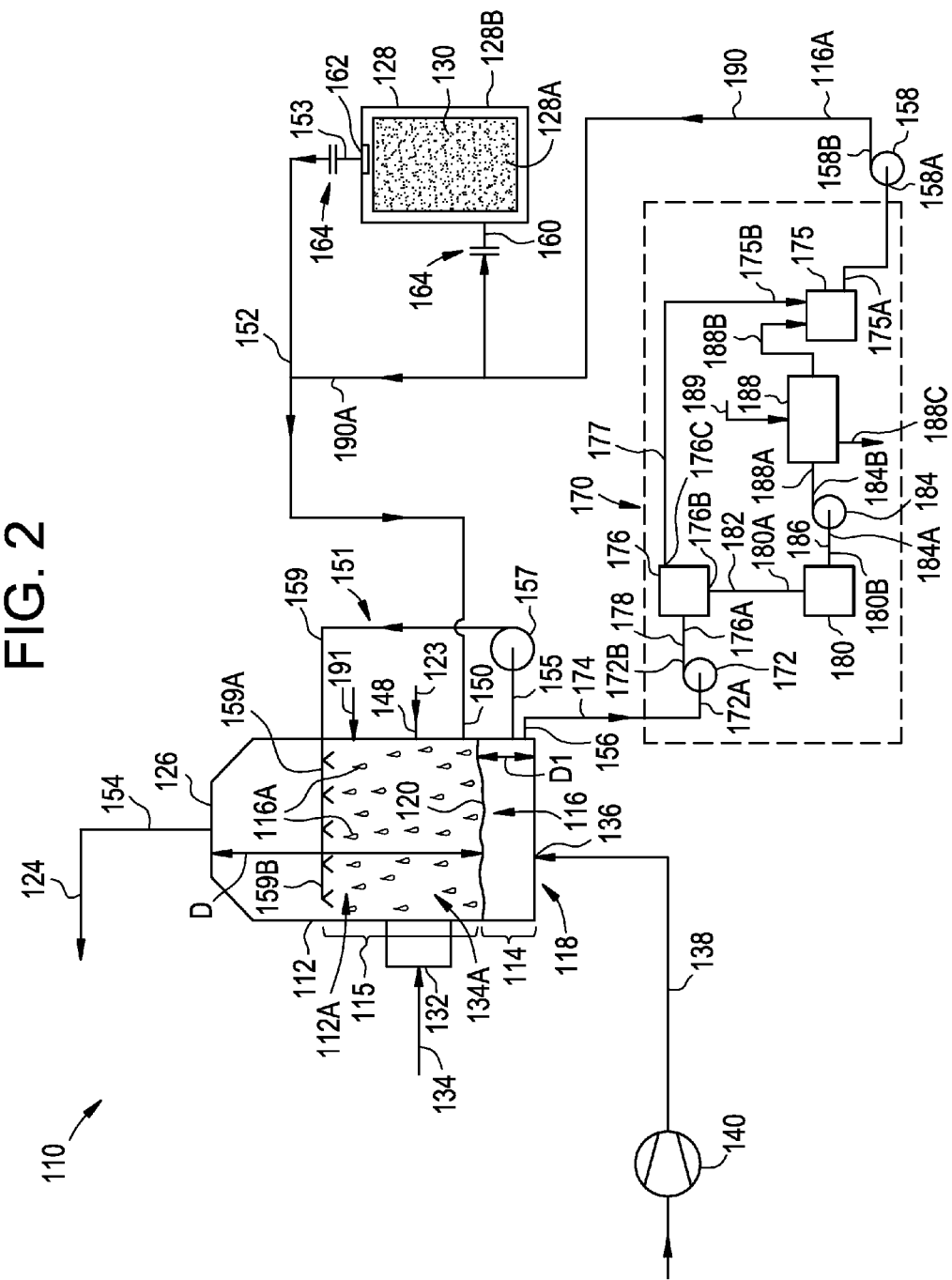
FIG. 2 is schematic diagram in cross section of another wet flue gas desulfurization system disclosed herein.

The WFGD system 110 of FIG. 2 is similar to the WFGD system 10 illustrated in FIG. 1, thus similar elements are designated with similar element numbers preceded by the numeral 1. The WFGD system 110 includes an absorber vessel 112 operable to remove pollutants from flue gas 134 supplied thereto. The absorber vessel 112 includes an interior area 112A a portion of which defines a slurry section 114 for containing a reagent slurry 116. The absorber vessel 112 includes a second outlet 156 in fluid communication with the slurry section 114. The WFGD system 110 includes a dewatering system 170 that is in fluid communication with the second outlet 156. The WFGD system 110 includes a mercury removal vessel 128 positioned downstream of and in fluid communication with the dewatering system 170. The outlet 152 of the mercury removal vessel 128 is in fluid communication with the fourth inlet 150 of the absorber vessel 112, for supplying treated effluent 152 to the absorber vessel 112. The mercury removal vessel 128 has activated carbon 130 disposed in an interior area 128A of the mercury removal vessel 128. In one embodiment, a pile of the activated carbon 130 is disposed in the interior area 128A of the mercury removal vessel 128.

As illustrated in FIG. 2, the dewatering system 170 includes a pump 172 having an inlet 172A in fluid communication with the second outlet 156 via a line 174. A dewatering classifier 176 is positioned downstream of the pump 172. An inlet 176A of the dewatering classifier 176 is in fluid communication with an outlet 172B of the pump 172 via a line 178. The dewatering classifier 176 is configured to separate solids from the reagent slurry. For example, the dewatering classifier is configured to dewater the reagent slurry 116 to produce an underflow stream 182 of about 50 percent solids. In one embodiment, the dewatering classifier 176 includes one or more hydrocyclones. The dewatering system 170 includes a solids transfer tank 180 positioned downstream of the dewatering classifier 176. The solids transfer tank 180 includes an inlet 180A that is in fluid communication with an outlet 178B of the dewatering classifier 176, via line 182. The dewatering system 170 includes another pump 184 positioned downstream of the solids transfer tank 180. The pump 184 includes an inlet 184A that is in fluid communication with an outlet 180B of the solids transfer tank 180 via line 186. The dewatering system 170 includes a filter 188 positioned downstream of the pump 184. The filter 188 includes an inlet 188A that is in fluid communication with an outlet 184B of the pump 184. The filter 188 includes a liquids outlet 188B that is in fluid communication with an effluent vessel 175 which defines an outlet 175A. The outlet 175A is in fluid communication with an inlet 158A of a pump 158. The filter 188 also includes a solids outlet 188C for discharge of solids, such as but not limited to, gypsum. The filter 188 also includes a water supply 189 for washing and producing the gypsum. The dewatering classifier 176 includes an outlet 176C that is in fluid communication with an inlet 175B of the effluent vessel 175 via a line 177. In one embodiment, a portion of the effluent stream 116A is returned to the absorber 112 via line 190A. Although the WFGD system 110 is shown and described as having the pump 158, the present disclosure is not limited in this regard as the pump 158 need not be provided.

The mercury removal vessel 128 is positioned downstream of the pump 158. The inlet 160 of the mercury removal vessel 128 is in fluid communication with the outlet 158B of the pump 158 via a line 190. The mercury removal vessel 128 is in fluid communication with the absorber vessel 112. In particular, the outlet 153 of the mercury removal vessel 128 is in fluid communication with the fourth inlet 150 of the absorber vessel 112 via a conduit 152. In addition, a bypass line 190A is in fluid communication with the line 190 and the line 152, thereby allowing a portion of the effluent 116A to bypass the mercury removal vessel 128.

While the dewatering system 170 is shown and described as having a pump 172, a solids transfer tank 180, a filter 188, a water supply 189 and a dewatering classifier 176, the present disclosure is not limited in this regard as other dewatering system configurations may be employed including but not limited to those having no pumps and/or those having only a filter and a water wash system.

The present disclosure includes a method of operating the WFGD system 110. The method includes providing an absorber vessel 112 that has the reagent slurry 116 contained in the slurry section 114. The absorber vessel 112 includes a second outlet 156 in fluid communication with the slurry section 114 of the interior area 112A. A dewatering system 170 in fluid communication with the second outlet 156, is also provided. A mercury removal vessel 128 is positioned downstream of and is in fluid communication with the dewatering system 170. The mercury removal vessel 128 has activated carbon 130 disposed in an interior area 128A of the mercury removal vessel 128. In one embodiment, the activated carbon 130 is self supported in the mercury removal vessel 128. The method includes supplying the reagent 123 to the absorber vessel 112 via the fourth inlet 148. The reagent 116 is aerated by flowing compressed air 138 through the second inlet 136 into the absorber vessel 112. Flue gas 134 is conveyed into the absorber vessel 112 via the first inlet 132. The flue gas 134 mixes and chemically reacts with the reagent slurry 116 to remove pollutants including mercury and sulfur dioxide from the flue gas 134. As a result, the reagent slurry 116 becomes mercury-rich. A portion of the mercury-rich reagent slurry 116 is directed from the absorber vessel 112 to the dewatering system 170. The dewatering system 170 separates solids from the mercury-rich reagent slurry 116 to produce a mercury-rich effluent 116A. The mercury-rich effluent or portion of the effluent is conveyed to the mercury removal vessel 128 via the pump 158. The activated carbon 130 disposed in the mercury removal vessel 128 adsorbs the mercury from the mercury-rich effluent 116A to produce a treated effluent 152. The treated effluent 152 that has substantially low levels of mercury therein is discharged from the mercury removal vessel 128 to the absorber vessel 112. In one embodiment, the treated effluent 152 is conveyed to another vessel in the WFGD system before being returned to the absorber vessel 112. In one embodiment, solids are separated from the mercury-rich reagent slurry 116 to create a mercury-rich effluent stream that has substantially lower suspended solids than the mercury-rich reagent slurry introduced to the dewatering system 170.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wet flue gas desulfurization system comprising:
   an absorber vessel operable to remove pollutants from flue gas supplied thereto, the absorber vessel defining a slurry section for containing a reagent slurry and an outlet in fluid communication with the slurry section; and
   a mercury removal vessel in fluid communication with the outlet and the mercury removal vessel having activated carbon disposed therein.

2. The wet flue gas desulfurization system of claim 1, wherein the activated carbon is disposed in the mercury removal vessel in at least one of a pile, a moving bed, a fluidized bed, and mixed in with the mercury-rich effluent.

3. The wet flue gas desulfurization system of claim 1, wherein the activated carbon is operable to remove substantially all mercury from the reagent slurry received in the mercury removal vessel.

4. The wet flue gas desulfurization system of claim 1, wherein the activated carbon is in at least one of pebble and granular form.

5. The wet flue gas desulfurization system of claim 1, wherein the mercury removal vessel is removably positioned in the wet flue gas desulfurization system.

6. The wet flue gas desulfurization system of claim 1, wherein the mercury removal vessel defines an outlet, which is in fluid communication with the absorber vessel.

7. A method of operating a wet flue gas desulfurization system, including:
   providing an absorber vessel defining a slurry section for containing a reagent slurry and an outlet in fluid communication with the slurry section, the outlet in fluid communication with a mercury removal vessel, the mercury removal vessel having activated carbon disposed therein;
   supplying a reagent and water to the absorber vessel;
   flowing flue gas containing mercury into the absorber vessel;
   the reagent slurry absorbing the mercury creating a mercury-rich reagent slurry;
   supplying a portion of the mercury-rich reagent slurry to the mercury removal vessel; and
   adsorbing the mercury from the mercury-rich reagent with the activated carbon disposed in the mercury removal vessel thereby producing treated reagent slurry.

8. The method of claim 7, wherein the treated reagent slurry is supplied to the absorber vessel.

9. The method of claim 7, wherein the activated carbon is disposed in the mercury removal vessel in at least one of a pile, a moving bed, a fluidized bed, and mixed in with the mercury-rich effluent.

10. A wet flue gas desulfurization system comprising:
    an absorber vessel operable to remove pollutants from flue gas supplied thereto, the absorber vessel defining a slurry section for containing a reagent slurry and an outlet in fluid communication with the slurry section;
    a dewatering system in fluid communication with the outlet; and
    a mercury removal vessel in fluid communication with and positioned downstream of the dewatering system, the mercury removal vessel having activated carbon disposed therein.

11. The wet flue gas desulfurization system of claim 10, wherein the activated carbon is disposed in the mercury removal vessel in at least one of a pile, a moving bed, a fluidized bed and mixed in with the mercury-rich effluent.

12. The wet flue gas desulfurization system of claim 10, wherein the activated carbon is operable to remove substantially all mercury from the reagent slurry received in the mercury removal vessel.

13. The wet flue gas desulfurization system of claim 10, wherein the activated carbon is in at least one of pebble and granular form.

14. The wet flue gas desulfurization system of claim 10, wherein the mercury removal vessel is removably positioned in the wet flue gas desulfurization system.

15. The wet flue gas desulfurization system of claim 10, wherein the mercury removal vessel defines an outlet, which is in fluid communication with the absorber vessel.

16. The wet flue gas desulfurization system of claim 10, wherein the dewatering system includes a dewatering classifier, a solids transfer vessel, an effluent vessel and a filter, the dewatering classifier is positioned downstream of and is in fluid communication with the absorber vessel, the solids transfer vessel is positioned downstream of and is in fluid communication with the dewatering classifier and the filter is positioned downstream of and is in fluid communication with the solids transfer vessel, the effluent vessel is positioned downstream of and is in fluid communication with the filter and the dewatering classifier and the mercury removal vessel is positioned downstream of and is in fluid communication with the effluent vessel and is in fluid communication with the absorber vessel.

17. A method of operating a wet flue gas desulfurization system, including:
    providing an absorber vessel defining a slurry section for containing a reagent slurry and an outlet in fluid communication with the slurry section;

providing a dewatering system in fluid communication with the outlet;

providing a mercury removal vessel in fluid communication with and positioned downstream of the dewatering system, the mercury removal vessel having activated carbon disposed therein;

supplying a reagent and water to the absorber vessel;

flowing flue gas containing mercury into the absorber vessel;

absorption of the mercury to produce a mercury-rich reagent slurry;

supplying a portion of the mercury-rich reagent slurry to the dewatering system to separate solids from the mercury-rich slurry and to produce a mercury-rich effluent;

supplying the mercury-rich effluent to the mercury removal vessel; and adsorbing the mercury from the mercury-rich effluent by the activated carbon in the mercury removal vessel thereby producing treated effluent.

18. The method of claim 17, wherein the treated effluent is supplied to the absorber vessel.

19. The method of claim 17, wherein the activated carbon is disposed in the mercury removal vessel in at least one of a pile, a moving bed, a fluidized bed, and mixed in with the mercury-rich effluent.

* * * * *